(12) United States Patent
Lai

(10) Patent No.: US 11,907,046 B2
(45) Date of Patent: Feb. 20, 2024

(54) DISTRIBUTED OBJECT IDENTIFICATION SYSTEM AND METHOD, AND EDGE COMPUTING DEVICE

(71) Applicant: TENCENT TECHNOLOGY (SHENZHEN) COMPANY LIMITED, Guangdong (CN)

(72) Inventor: Wenxing Lai, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 121 days.

(21) Appl. No.: 17/709,768

(22) Filed: Mar. 31, 2022

(65) Prior Publication Data

US 2022/0222134 A1    Jul. 14, 2022

Related U.S. Application Data

(63) Continuation of application No. PCT/CN2021/078060, filed on Feb. 26, 2021.

(30) Foreign Application Priority Data

Apr. 9, 2020    (CN) .......................... 202010272649.4

(51) Int. Cl.
  *G06F 11/07*    (2006.01)
  *G06F 11/20*    (2006.01)

(52) U.S. Cl.
  CPC ...... *G06F 11/0709* (2013.01); *G06F 11/0793* (2013.01); *G06F 11/2033* (2013.01)

(58) Field of Classification Search
  CPC ............. G06F 11/0709; G06F 11/0736; G06F 11/0751; G06F 11/0793; G06F 11/142;
  (Continued)

(56) References Cited

U.S. PATENT DOCUMENTS 9,141,849 B2 * 9/2015 Kono .................. G06V 40/16
9,172,918 B2 * 10/2015 Palmer ............... G06F 11/2033
(Continued)

FOREIGN PATENT DOCUMENTS

CN    104834722 A    8/2015
CN    105046303 A    11/2015
(Continued)

OTHER PUBLICATIONS

Chinese Office Action for Chinese Application No. 202010272649.4 dated Dec. 16, 2020, 12 pages.
(Continued)

*Primary Examiner* — Joseph R Kudirka
(74) *Attorney, Agent, or Firm* — Sughrue Mion, PLLC

(57) ABSTRACT

An edge computing device is provided including at least one memory configured to store computer program code and at least one processor configured to access said computer program code and operate as instructed by said computer program code. The edge computing device is included in a distributed object identification system, which includes a plurality of edge computing devices, and the edge computing device is determined as a central control device based on election from the plurality of edge computing devices. The computer program code includes first capturing code configured to cause the at least one processor to capture a video stream of an environment and first obtaining code configured to cause the at least one processor to obtain identity information of an object in the video stream by performing object identification on the video stream.

20 Claims, 7 Drawing Sheets

(58) Field of Classification Search
CPC ............. G06F 11/2033; G06F 11/3006; G06F 11/3055; G06V 20/46; G06V 20/48; G06V 20/52; G06V 40/172
See application file for complete search history.

(56) References Cited

U.S. PATENT DOCUMENTS

| | | | |
|---|---|---|---|
| 10,534,964 B2* | 1/2020 | Alrabeiah | ............... G06T 7/246 |
| 2014/0026223 A1 | 1/2014 | Dave et al. | |
| 2021/0409791 A1* | 12/2021 | Larrew | ............ H04N 21/23418 |

FOREIGN PATENT DOCUMENTS

| | | |
|---|---|---|
| CN | 108446680 A | 8/2018 |
| CN | 109218100 A | 1/2019 |
| CN | 111476171 A | 7/2020 |

OTHER PUBLICATIONS

International Search Report for PCT/CN2021/078060 dated May 27, 2021.
Written Opinion for PCT/CN2021/078060 dated May 27, 2021.

\* cited by examiner

US 11,907,046 B2

DISTRIBUTED OBJECT IDENTIFICATION SYSTEM AND METHOD, AND EDGE COMPUTING DEVICE

CROSS-REFERENCE TO RELATED APPLICATION(S)

This application is a continuation application of International Application No. PCT/CN2021/078060, filed on Feb. 26, 2021, which claims priority to Chinese Patent Application No. 202010272649.4, filed with the China National Intellectual Property Administration on Apr. 9, 2020, the entire contents of which are incorporated by reference.

FIELD

The disclosure relates generally to distributed computing technologies, and in particular, to a distributed object identification system and method, an edge computing device, and a computer-readable storage medium.

BACKGROUND

Object identification may refer to the identification of a specific object from a video stream or an image, for example, human faces. The object identification technology is widely applied to scenarios such as campus security and community security. By means of the constructed object identification system, the effective monitoring of specific scenarios may be realized, which facilitates the safety protection and object statistics of the specific scenarios. In order to reduce the pressure on a single device during the object identification, an object identification system may be constructed based on the distributed principle.

In the solutions provided in the related art, distribution is mainly embodied as computing clusters. For example, a cluster including a plurality of computing servers is constructed, video streams of an environment are uniformly transmitted to the cluster, and each computing server in the cluster shares part of computing tasks. However, during a specific implementation, in view of the type of the distributed system, in a case that there is a fault in one step (for example, a step of transmitting the video stream), the entire distributed system faces the risk of unavailability and poor stability.

SUMMARY

Provided are a distributed object identification system and method, an edge computing device, and a computer-readable storage medium, so as to strengthen the fault-tolerant capability and improve the stability and robustness of the system.

In accordance with an aspect of an example embodiment of the disclosure, an edge computing device may include at least one memory configured to store computer program code, at least one processor configured to access said computer program code and operate as instructed by said computer program code. The edge computing device may be included in a distributed object identification system including a plurality of edge computing devices, wherein the edge computing device is determined as a central control device based on election from the plurality of edge computing device. The computer program code may include first capturing code configured to cause the at least one processor to capture a video stream of an environment, first obtaining code configured to cause the at least one processor to obtain identity information of an object in the video stream by performing object identification on the video stream, first monitoring code configured to cause the at least one processor to monitor an operating status of each of the plurality of edge computing devices, and first performing code configured to cause the at least one processor to perform a fault response operation on one edge computing device of the plurality of edge computing devices in a fault status based on the one edge computing device in the fault status being monitored.

In accordance with an aspect of an example embodiment of the disclosure, an edge computing method, performed by an edge computing device included in a distributed object identification system including a plurality of edge computing devices, wherein the edge computing device is determined as a central control device based on election from the plurality of edge computing devices, may include determining, capturing a video stream of an environment, obtaining identity information of an object in the video stream by performing object identification on the video stream, monitoring an operating status of each of the plurality of edge computing devices, and performing fault response operation on one edge computing device of the plurality of edge computing devices in a fault status based on the one edge computing device in the fault status being monitored.

In accordance with an aspect of an example embodiment of the disclosure, a non-transitory computer-readable storage medium may store computer instructions that, when executed by at least one processor of a device, the device including an edge computing device included in a distributed object identification system including a plurality of edge computing devices, wherein the edge computing device is determined as a central control device based on election from the plurality of edge computing devices, cause the at least one processor capture a video stream of an environment, obtain identity information of an object in the video stream by performing object identification on the video stream, monitor an operating status of each of the plurality of edge computing devices, and perform a fault response operation on one edge computing device of the plurality of edge computing devices in a fault status based on the one edge computing device in the fault status being monitored.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

Figure 1:
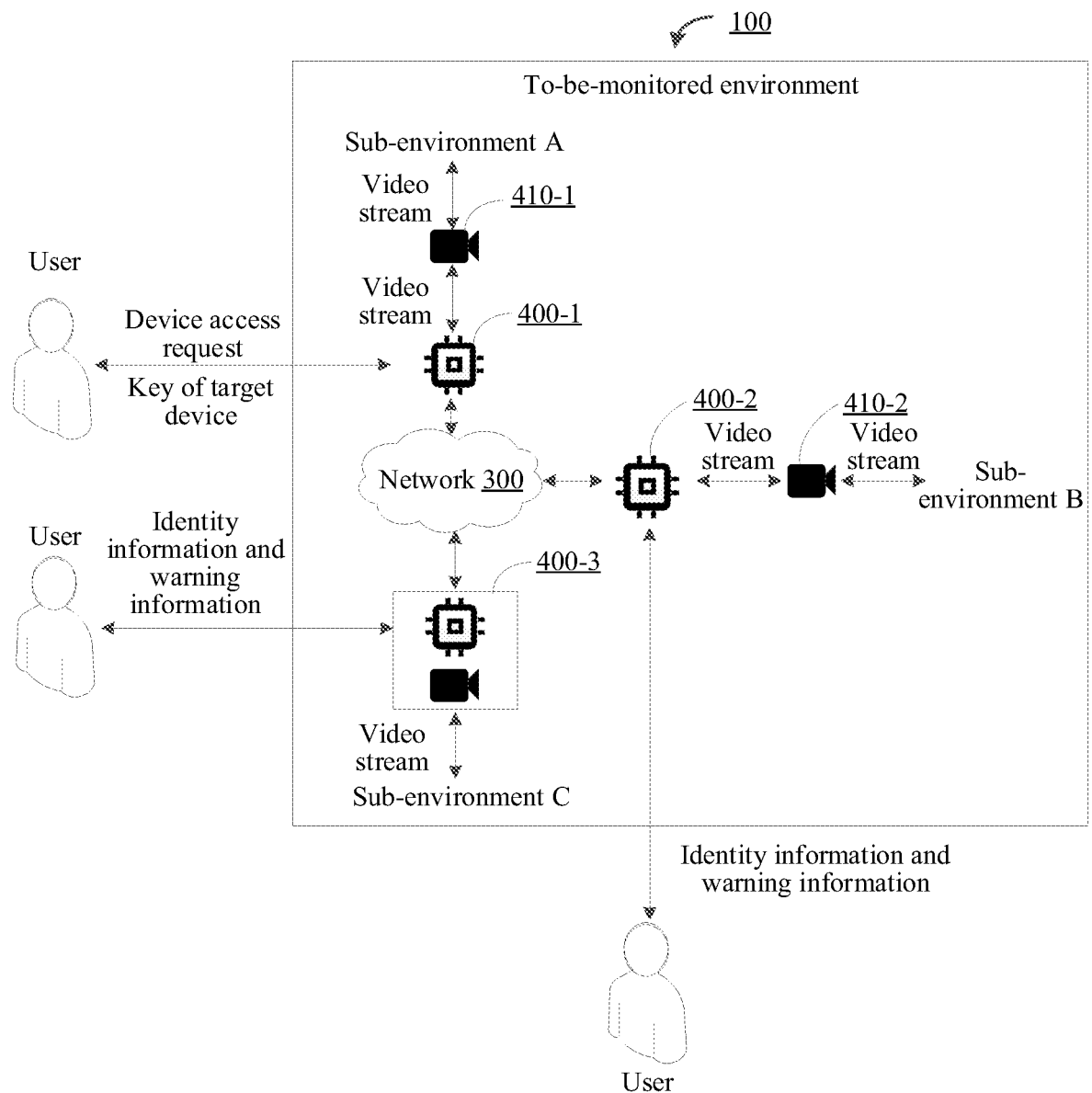
FIG. 1 is a diagram of an architecture of a distributed object identification system according to an embodiment.

To make objectives, technical solutions, and advantages of this disclosure clearer, the following further describes this disclosure in detail with reference to the accompanying drawings. The described embodiments are not to be construed as a limitation to this disclosure. All other embodiments obtained by a person of ordinary skill in the art without creative efforts shall fall within the protection scope of this disclosure.

In the following descriptions, the involved term "some embodiments" describes subsets of all possible embodiments. However, it may be understood that the "some embodiments" may be the same subset or different subsets of all the possible embodiments, and may be combined with each other without conflict.

In the following descriptions, the involved term "first/second" is merely intended to distinguish similar objects but does not necessarily indicate a specific order of an object. It may be understood that "first/second" is interchangeable in terms of a specific order or sequence if permitted, such that the embodiments of this disclosure may be implemented in a sequence in addition to the sequence shown or described herein. In addition, in the following description, the involved term "plurality of" means at least two.

Unless otherwise defined, meanings of all technical and scientific terms used in this specification are the same as those usually understood by a person skilled in the art to which this disclosure belongs. Terms used in this specification are merely intended to describe objectives of the embodiments of this disclosure, but are not intended to limit this disclosure.

Before the embodiments of this disclosure are further described in detail, a description is made on terms in the embodiments of this disclosure, and the terms in the embodiments of this disclosure are applicable to the following explanations.

1) Cloud computing may refer to a computing mode, in which computing tasks are distributed on a resource pool formed by a large quantity of computers, such that various application systems may obtain computing power, storage space, and information services according to requirements. A network that provides resources is referred to as a "cloud".

2) Cloud storage may refer to a concept extended and developed based on the concept of cloud computing. A distributed cloud storage system (hereinafter referred to as a storage system) may refer to a storage system that captures, by using functions such as a cluster application, a grid technology, and a distributed storage file system, various different types of storage devices (also referred to as storage nodes) in a network through application software or application interfaces to work together, to provide data storage and business access functions to the outside world.

3) Edge computing may refer to providing a nearest-end service nearby by means of a network capability, a computing capability, a storage capability, an application capability, and the like on a side close to an object or a data source. In a sense, the edge computing may be regarded as a supplement to cloud computing or preprocessing of cloud computing.

4) An edge computing device may be configured to provide an edge computing service. In an embodiment of this disclosure, the edge computing device includes two types. One type is required to be connected to an external camera, and a camera is integrated in a second type. A distributed object identification system (or object recognition system) may be constructed according to at least one of the two types of edge computing devices.

5) Object identification may mean that a specific object such as a human face or a vehicle is identified from a video stream or an image. The object identification may be implemented by using a set rule or an artificial intelligence model.

6) A monitor, in a general sense, may refer to various types of personnel and devices related to an environment that is monitored.

7) Blockchain is an encrypted chain transaction storage structure formed by blocks.

8) A blockchain network may refer to a set of a series of nodes of a blockchain in which a new block is included through consensus.

In the solution provided in the related art, in order to reduce the pressure on a single device during the object identification, a cluster including a plurality of computing servers is generally constructed, so as to provide a distributed computing service. For example, the computing servers may be cloud servers. During the object identification, the video stream or a real-time image of the monitored environment is uniformly transmitted to an access server from the camera, and then distributed to each computing server in the cluster by the access server. However, the solution provided in the related art has the following disadvantages. 1) Use costs are high. Specifically, a plurality of servers (for example, the computing servers, storage servers, and the like) are required to be purchased and maintained, which requires to spend a lot of costs. 2) A requirement for a network condition is high. Real-time transmission of the image or the video stream requires relatively high transmission bandwidth. In a case that the network condition is poor, a relatively long delay may be caused. 3) Safety is insufficient. Since a common camera fails to bear computing overheads of an encrypted video stream, the camera generally transmits the image or the video stream to the access server based on an unencrypted real time streaming protocol (RTSP), and then perform distribution. In the process, pictures including user behaviors are easily leaked. 4) The stability is poor. In a case that one step during the object identification is interrupted, for example, a failure of the access server, the entire system may be unavailable.

Embodiments of this disclosure provide a distributed object identification system and method, an edge computing device, and a computer-readable storage medium, so as to improve the stability of object identification and robustness of the system. Exemplary application of the edge computing device according to the embodiments of this disclosure is described below.

FIG. 1 is a diagram of an architecture of a distributed object identification system 100 according to an embodiment. In order to support a distributed object identification application, edge computing devices 400 are deployed in an environment. Herein, the edge computing devices 400-1, 400-2, and 400-3 that are connected through a network 300 and serve as embedded devices are shown by way of example. The network 300 may be a wired network or a wireless network, which is not limited in the embodiments of this disclosure.

FIG. 1 shows two types of edge computing devices. The edge computing device 400-1 is configured to be connected to an external camera 410-1. The edge computing device 400-2 is configured to be connected to an external camera 410-2. For ease of distinguishing, the type of edge computing device is named a first edge computing device. The first edge computing device is connected to the external camera in a wired or wireless manner. A camera is integrated in the edge computing device 400-3, and the type of the edge computing device is named a second edge computing device. The distributed object identification system 100 may be constructed based on the first edge computing device, may be constructed based on the second edge computing device, or may be constructed jointly based on the first edge computing device and the second edge computing device.

The plurality of edge computing devices in the distributed object identification system 100 are configured to monitor the environment. Specifically, each edge computing device is configured to acquire a video stream of a corresponding sub-environment. The sub-environments monitored by different edge computing devices may be the same or different. For example, in a security scenario, the environment is an entire campus, such that the edge computing devices may be deployed at different positions (sub-environments) of the campus, for example, a front gate, a teaching building, a playground, and the like. During the object identification, all of the edge computing devices perform election to determine a central control device from the plurality of edge computing devices in the environment. In addition, each edge computing device captures the video stream of the corresponding sub-environment, and perform object identification on the video stream to obtain identity information of an object in the video stream. The edge computing devices may report the obtained identity information to users. The users shown in FIG. 1 may refer to various types of personnel related to the environment. The elected central control device monitors an operating status of each of the plurality of edge computing devices (including the central control device itself), and performs a fault response operation on one edge computing device in a fault status in a case that the edge computing device in the fault status is monitored. In the embodiments of this disclosure, since each edge computing device performs operations such as video capture and object identification on the corresponding sub-environment, normal operations of other edge computing devices are not affected even if one edge computing device fails. Therefore, the stability and the robustness of the system may be improved.

For example, the central control device is the edge computing device 400-3. The edge computing device 400-3 monitors the operating status of the edge computing devices 400-1, 400-2, and 400-3. In a case that it is detected that the edge computing device 400-1 is in the fault status, fault information is used as warning information to be transmitted to the users. The cause of the failure is not limited in the embodiments of this disclosure. For example, the edge computing device 400-1 may not work, or a network connection with the edge computing device 400-1 may be disconnected or unstable. In addition, for the edge computing devices except for the central control device, the operating status of the edge computing devices may also be monitored. In a case that the edge computing devices are in the fault status, the fault information is used as warning information to be transmitted to the users.

In addition, the central control device may further determine an interactive device from the plurality of edge computing devices. The interactive device is configured to perform interaction with the users. In FIG. 1, the interactive device being the edge computing device 400-1 is used as an example for description. Each edge computing device in the distributed object identification system has a key generated by an encryption algorithm, and encrypts the video stream according to the key after capturing the video stream. The edge computing device 400-1 acquires keys possessed by the plurality of edge computing devices, determines, from the plurality of edge computing devices, a target device requested by a device access request when receiving the device access request, and transmits a key possessed by the target device to an initiator (the user shown in FIG. 1) of the device access request. Therefore, the initiator may decrypt the encrypted video stream in the target device according to the key possessed by the target device, so as to effectively enhance the safety during the interaction.

The embodiments of this disclosure may also be implemented by combining a blockchain technology. Blockchain is a new application mode of computer technologies such as distributed data storage, point-to-point transmission, a consensus mechanism, an encryption algorithm, and the like. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

The blockchain underlying platform may include processing modules such as a user management module, a basic service module, an intelligent contract module, and an operation supervision module. The user management module is responsible for identity information management of all blockchain participants, including maintaining public-private key generation (account management), key management, maintaining a correspondence between the real identity of a user and a blockchain address (permission management), and the like, supervising and auditing transaction conditions of some real identities with authorization, and providing rule configuration of risk control (risk control auditing). The basic service module is deployed on all blockchain node devices and configured to verify the validity of a service request, and after a consensus is reached on a valid request, record the valid request in storage. For a new service request, the basic service module first parses interface adaptation and performs authentication processing (interface adaptation), then encrypts service information by using a consensus algorithm (consensus management), transmits the complete and consistent service information after encryption to a shared ledger (network communication), and performs recording and storing. The intelligent contract module is responsible for contract registration and publication, contract triggering, and contract execution. A developer may define contract logic by using a programming language, and release the contract logic onto a blockchain (contract registration). According to the logic of contract items, a key or another event is invoked to trigger execution, to complete the contract logic. The function of upgrading or canceling a contract is further provided. The operation supervision module is mainly responsible for deployment, configuration modification, contract setting, and cloud adaptation during product releasing and visualized output of a real-time status during product operation, for example, alarming, monitoring network conditions, and monitoring a health status of a node device.

Figure 2:
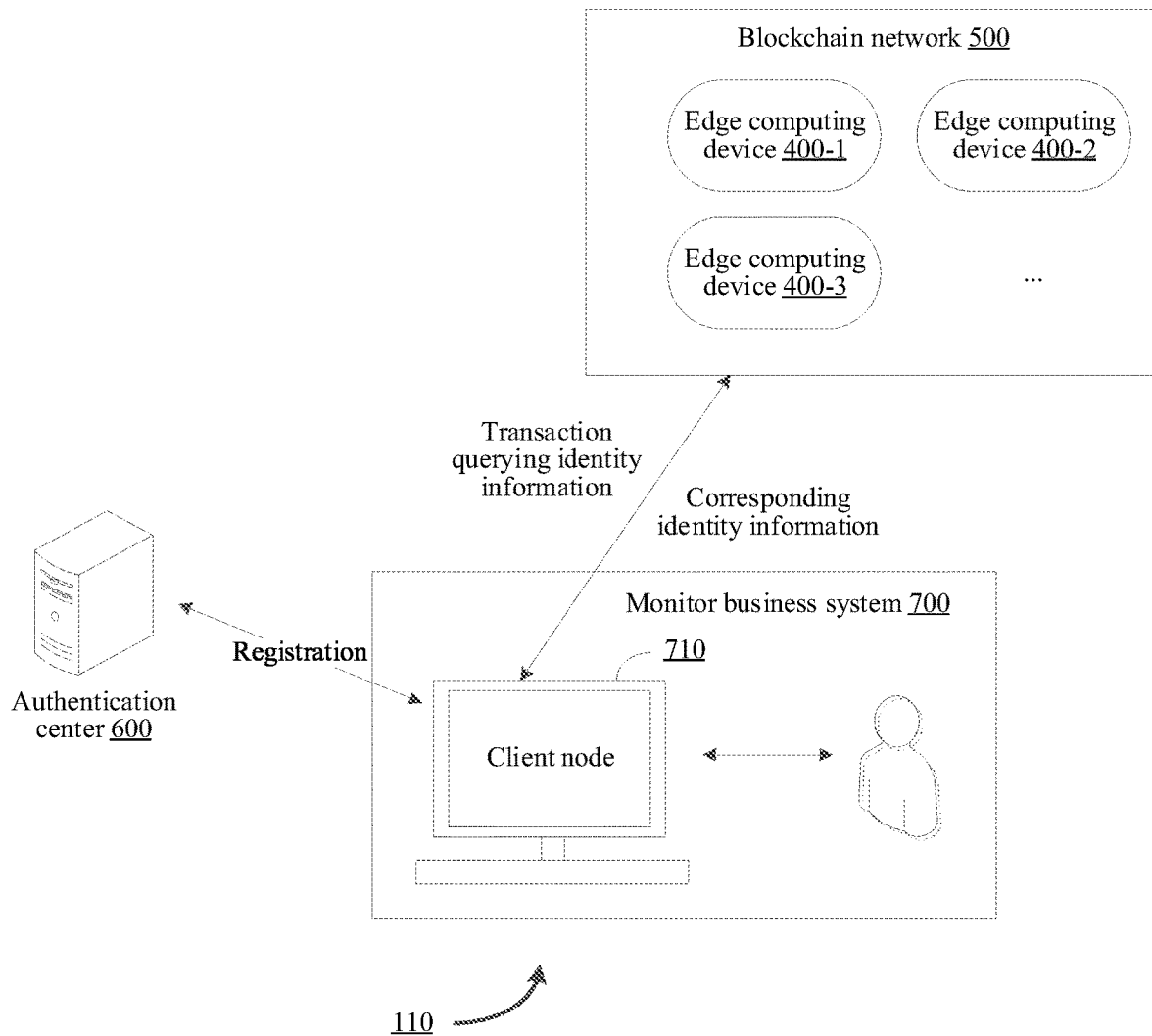
FIG. 2 is a diagram of an architecture of a distributed object identification system combining a blockchain network according to an embodiment.

FIG. 2 is a diagram of an architecture of a distributed object identification system combining a blockchain network according to an embodiment. The distributed object identification system includes a blockchain network 500 (exemplarily showing the edge computing device 400-1 to the edge computing device 400-3), an authentication center 600, and a monitor business system 700 (exemplarily showing an electronic device 710 belonging to the monitor business system 700). Details are described below respectively.

The edge computing device 400-1 to the edge computing device 400-3 shown in FIG. 1 may be added to the blockchain network 500 to become native nodes in the blockchain network 500. A type of the blockchain network 500 is flexible and may be, for example, any one of a public chain, a private chain, or a consortium chain. The public blockchain is used as an example. The electronic device in any business system, for example, a terminal device and a server, may be connected to the blockchain network 500 without authorization. The consortium blockchain is used as an example. The electronic device (for example, the terminal device/the server) in the business system after being authorized may be connected to the blockchain network 500. In this case, special nodes in the blockchain network 500 are client nodes.

The client nodes may only provide a function of supporting the business system to initiate a transaction (for example, for storing data on a chain or query the data on the chain). For the functions of the native nodes of the blockchain network 500, for example, a sorting function, a consensus service, and an account book function, and the like in the following, the client nodes may be implemented by default or electively (for example, depending on specific business requirements of the business system). In this way, data and service processing logic of the service system may be migrated to the blockchain network 500 to the greatest extent, and credibility and traceability of the data and service processing processes are implemented through the blockchain network 500.

The blockchain network 500 receives transactions submitted by the client nodes (for example, the electronic device 710 belonging to the monitor business system 700 shown in FIG. 2) of the business system (for example, the monitor business system 700 shown in FIG. 2), so as to perform the transaction to update an account book or query the account book.

The business system connected to the blockchain network to realize the query of identity information is used as an example to describe the exemplary application of the blockchain network.

First, the edge computing device 400 (referring to any of the edge computing devices 400-1 to 400-3) performs object identification on the video stream to obtain the identity information after capturing the video stream, and broadcasts the identity information to the blockchain network 500 in the form of transactions. After the other edge computing devices 400 in the blockchain network 500 perform verification, block filling, and consensus on the transaction, a new block including the identity information is added to an end of the blockchain, and a transaction in the new block is performed. For the transaction having the identity information submitted, the identity information is stored in a state database in the form of key-value pairs.

Then, in a case that the identity information needs to be acquired, the related personnel (for example, security personnel of the environment) of the monitor business system 700 accesses the blockchain network 500 by using the electronic device 710 of the monitor business system 700, so as to become the client nodes of the blockchain network 500.

Therefore, a transaction for querying the identity information is generated by using the electronic device 710. A smart contract that needs to be called to implement a query operation and parameters transmitted to the smart contract are specified in the transaction. The transaction further carries a digital certificate of the monitor business system 700 and is broadcast to the blockchain network 500. The digital certificate may be obtained by registering with the authentication center 600 by the monitor business system 700. In addition to this, the specific edge computing device corresponding to the identity information required to be queried may further be specified in the transaction, for example, the identity information identified by the edge computing device 400-1 is designated for query.

The edge computing device 400 in the blockchain network 500 verifies the digital certificate carried by the transaction when receiving the transaction. After the digital certificate is successfully verified, it is determined, according to an identity of the monitor business system 700 carried in the transaction, whether the monitor business system 700 has a transaction authority. Any verification and determination in a digital signature and authority verification may cause a transaction failure. After the verification succeeds, a digital signature of the edge computing device 400 is signed, and broadcasting is continuously performed in the blockchain network 500.

After receiving the transaction that the verification succeeds, the edge computing device 400 having a sorting function in the blockchain network 500 fills the transaction in the new block, and broadcasts the transaction to the edge computing device 400 providing a consensus service in the blockchain network 500.

The edge computing device 400 providing the consensus service in the blockchain network 500 perform a consensus process on the new block to reach an agreement. The edge computing device 400 providing the account book function adds the formed new block to the end of the blockchain, and performs the transaction in the new block. For the transaction querying the identity information, the identity information is queried from the state database (for example, the identity information identified by the edge computing device 400-1 is queried), and transmitted to the electronic device 710. The data stored in the state database is generally the same as data stored in the blockchain. During the response to the query transaction, responding is preferentially performed according to the data in the state database, thereby improving the response efficiency.

Definitely, in addition to putting the identity information on the chain, other information related to the edge computing device 400 may also be put on the chain for the monitor business system 700 to query. Information that may be put on the chain includes, but is not limited to, the encrypted video stream, a distribution relationship between the first edge computing devices and the external cameras, and configuration information of the edge computing devices, which may be specifically set according to an actual application scenario. In the foregoing manner, the accuracy and the validity of data obtained through querying may be enhanced.

Exemplary application of the edge computing devices provided in the embodiments of this disclosure is continuously described below. The type of the edge computing devices is not limited in the embodiments of this disclosure. For example, the edge computing devices may integrate the cameras inside, or may be connected to the external cameras.

Figure 3:
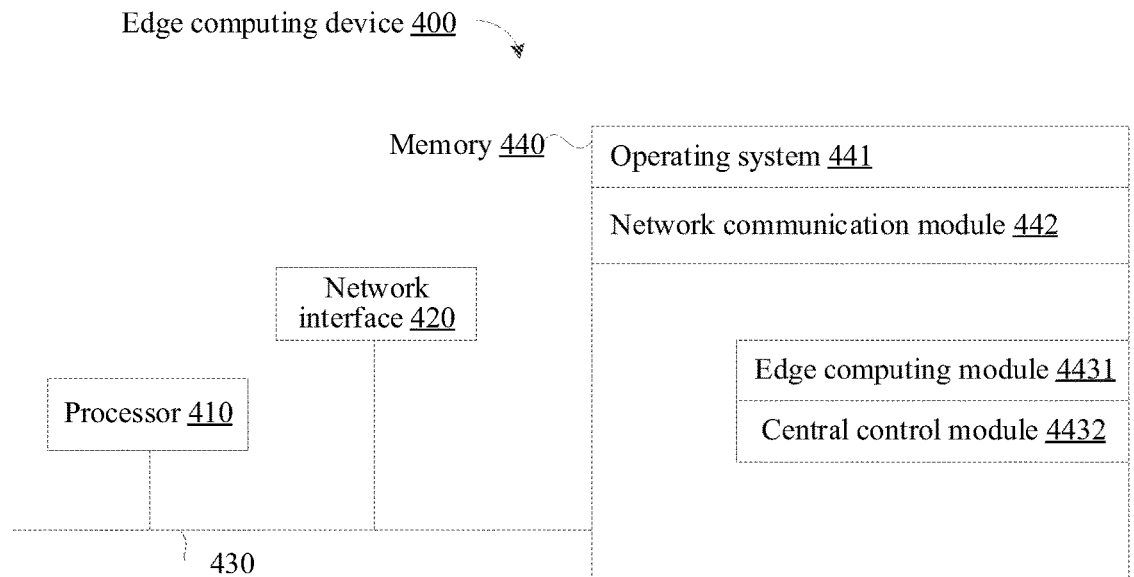
FIG. 3 is a diagram of an architecture of an edge computing device according to an embodiment.

FIG. 3 is a diagram of an architecture of an edge computing device 400 (for example, the edge computing device may be the edge computing devices 400-1, 400-2, and 400-3 shown in FIG. 1) according to an embodiment. The edge computing device 400 shown in FIG. 3 includes at least one processor 410, a memory 440, and at least one network interface 420. Various assemblies in the server 400 are coupled together by using a bus system 430. It may be understood that the bus system 430 is configured to implement connection and communication between the components. In addition to a data bus, the bus system 430 further includes a power bus, a control bus, and a status signal bus. However, for ease of clear description, all types of buses are marked as the bus system 430 in FIG. 3.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 440 is removable, non-removable, or a combination thereof. Exemplary hardware devices include a solid-state memory, a hard disk drive, an optical disc driver, or the like. The memory 440 includes one or more storage devices at a physical location away from the processor 410.

The memory 440 includes a volatile memory or a non-volatile memory, or may include a volatile memory and a non-volatile memory. The non-volatile memory may be a read-only memory (ROM). The volatile memory may be a random access memory (RAM). The memory 440 described in this embodiment of this disclosure is to include any other suitable type of memories.

In some embodiments, the memory 440 may store data and support various operations. Examples of the data include a program, a module, and a data structure, or a subset or a superset thereof. An exemplary description is given below.

An operating system 441 includes a system program configured to process various basic system services and perform a hardware-related task, for example, a framework layer, a core library layer, and a driver layer, and is configured to implement various basic services and process a hardware-related task.

A network communication module 442 is configured to reach another computing device through one or more (wired or wireless) network interfaces 420. Exemplary network interfaces 420 include: Bluetooth, wireless compatible authentication (Wi-Fi), a universal serial bus (USB), or the like.

In some embodiments, the edge computing device provided in the embodiments of this disclosure may adopt software to implement distributed object identification. FIG. 3 shows the following soft modules stored in the memory 440: an edge computing module 4431 and a central control module 4432. These modules are logical. Therefore, any combination or further splitting may be performed according to the implemented functions. Functions of the modules are to be described below.

In some other embodiments, the edge computing device provided in the embodiments of this disclosure may adopt hardware to implement the distributed object identification. As an example, a processor in a form of a hardware decoding processor may be adopted, and programmed to perform the distributed object identification method provided in the embodiments of this disclosure. For example, the processor in the form of the hardware decoding processor may adopt one or more application specific integrated circuits (ASIC), digital signal processors (DSP), programmable logic devices (PLD), complex programmable logic devices (CPLD), field-programmable gate arrays (FPGA), or other electronic elements.

A process of implementing the distributed object identification method by using the edge computing device is described below with reference to the exemplary applications and structures of the edge computing device recorded above.

Figure 4A:
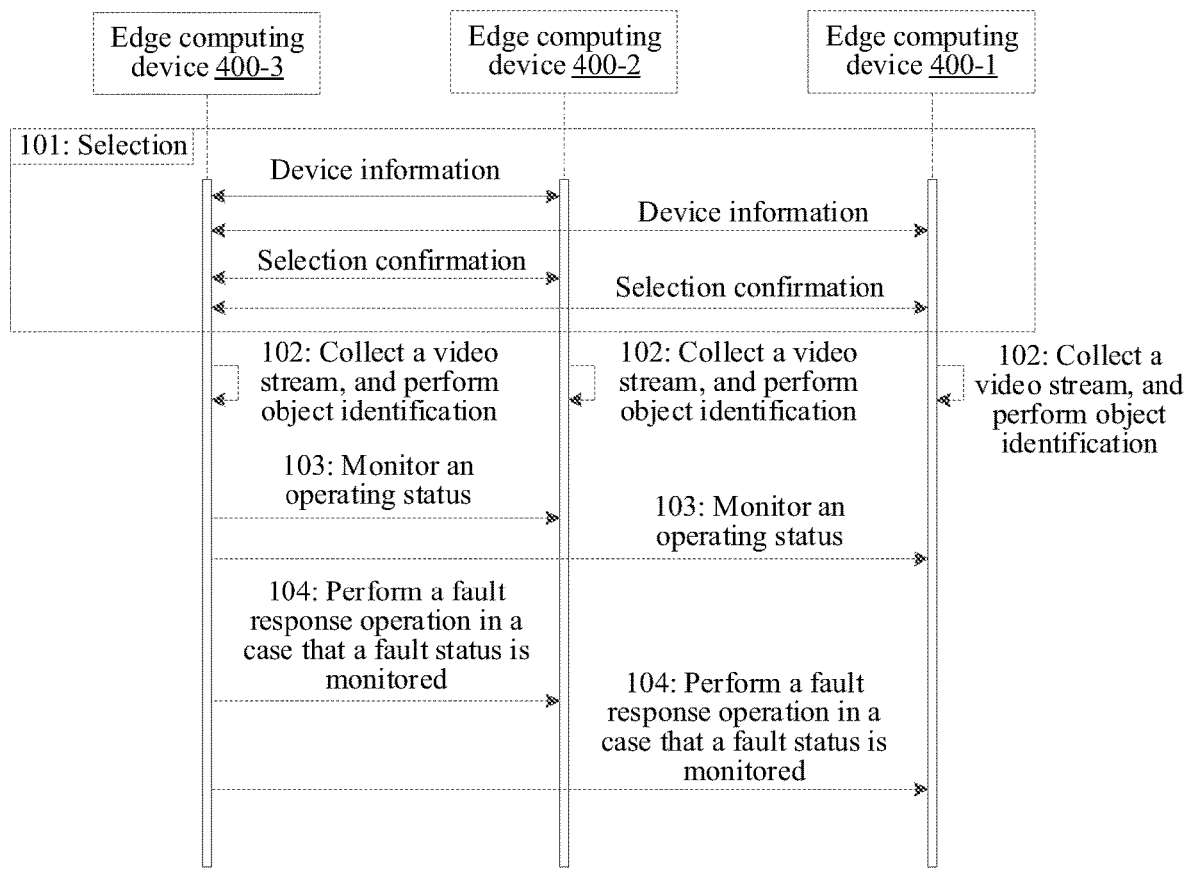
FIG. 4A is a flowchart of a distributed object identification method according to an embodiment.

FIG. 4A is a flowchart of a distributed object identification method according to an embodiment. By using the edge computing devices 400-1, 400-2, and 400-3 shown in FIG. 1 as an example, a description is given with reference to steps shown in FIG. 4A.

In operation 101, a plurality of edge computing devices in an environment perform election to determine a central control device from the plurality of edge computing devices in the environment.

In some embodiments, the election may be performed based on various election algorithms of a distributed system, for example, raft, paxos, bully, and the like. The election algorithms are used for electing, as the central control device, the edge computing device serving as a coordinator during the interaction of the plurality of edge computing devices, to coordinate the operation of other edge computing devices by using the elected central control device, thereby implementing the stable operation of the distributed system. The election algorithms are widely applied in the field such as load balancing, fault repairing, and the like.

As an example, the election is performed on the plurality of edge computing devices distributed in the environment and connected by a network, to elect the central control device. An election manner is that each edge computing device transmits a request to other edge computing devices to acquire device information of the other edge computing devices. Then, the edge computing device elects the central control device from all of the edge computing devices according to a set election condition and the device information of all of the edge computing devices. The device information includes, but is not limited to, a device type, a network condition, and a processing capability. The election condition is a rule corresponding to the device information, which may be set according to actual application scenarios. For example, the device type is required to be one or more preset types, the network condition is required to be a wired connection and the degree of network congestion is required to be lower than a congestion threshold, and the processing capability is required to be higher than a set processing capability threshold. FIG. 4A only shows a process of acquiring device information of the other edge computing devices mainly by using the edge computing device 400-3. However, the edge computing device 400-2 may also acquire the device information of the other edge computing devices such as the edge computing device 400-1.

After each edge computing device elects the central control device, further confirmation may be performed. For ease of distinguishing, the central control device independently elected by each edge computing device is named a candidate device. Then, each edge computing device may transmit related information of the candidate device to the other edge computing devices for confirmation. Herein, a confirmation condition may be preset. For example, a proportion of the candidate devices in all of the candidate devices exceeds the election threshold (for example, 90%). In a case that one candidate device satisfies the confirmation condition, all of the edge computing devices jointly confirm the candidate device as the final central control device. In FIG. 4A, the finally elected central control device is the edge computing device 400-3 by way of example.

In operation 102: each edge computing device captures a video stream of the environment, and performs object identification on the video stream to obtain identity information of an object in the video stream.

Each edge computing device distributed in the environment is configured to capture the video stream of the environment, and perform object identification on the video stream, thereby identifying the identity information in the video stream. Herein, the object may be a person, wildlife, vehicles, and the like, which is determined according to a specific object identification scenario.

In some embodiments, such a manner may be used for implementing the object identification on the video stream to obtain the identity information of the object in the video stream. The edge computing device extracts an image from the captured video stream, and performs feature extraction on the image to obtain an object feature. The object feature is matched with a plurality of object feature samples in a database. The identity information corresponding to the matched object feature samples is used as the identity information of the object in the video stream.

During the object identification, the edge computing device extracts the image from the video stream and extracts the object feature from the image. The image may be extracted at a set frame extraction frequency, such as once every 2 seconds. The obtained object feature is matched with the plurality of object feature samples in the database. In a case that a similarity between the object feature and one object feature sample is greater than a similarity threshold, it is determined that the matching is successful. The identity information corresponding to the object feature sample in the database is acquired and is used as the identity information of the object in the video stream. For example, in a scenario of face identification, the identity information may include a name and gender of a person. In the foregoing manner, the identity of the object in the environment may be effectively monitored, thereby improving the safety of the environment.

In some embodiments, after operation 102, the method further includes transmitting, by the edge computing device, the identity information to a monitor of the environment.

After the edge computing device obtains the identity information, data is reported according to the identity information. Specifically, the identity information is transmitted to an address designated by the monitor of the environment. In some cases, the address designated by the monitor may be located in an external network. In a case that the edge computing device fails to be connected to the external network, the edge computing device may transmit the identity information to the other edge computing devices that may be connected to the external network. The identity information is forwarded to the designated address by the other edge computing devices. For example, the identity information may be transmitted to an interactive device and then forwarded by the interactive device. A determination process of the interactive device is to be described below. In the manner of data reporting, a monitoring requirement of the monitor may be satisfied, such that the monitor may conveniently perform operations such as object statistics according to the reported identity information.

In some embodiments, after operation 102, the method further includes monitoring, by the edge computing device, an operating status of the edge computing device, performing real-time warning according to fault information causing the fault status in a case that it is detected that the operating status of the edge computing device is the fault status, for a set transmission periods, transmitting the identity information obtained within the transmission period to an archive server, and performing real-time warning according to the identity information in a case that the identity information belongs to a suspicious identity.

In the embodiments of this disclosure, the edge computing device may monitor the operating status thereof, and perform real-time warning according to the fault information causing the fault status in a case that it is detected that the operating status is the fault status, for example, transmit the fault information to the monitor of the environment. The edge computing device may further transmit the obtained identity information to the set archive server for archiving. Since archiving does not require high timeliness, every set transmission period (such as 10 seconds) may be set. The identity information obtained within the transmission period is transmitted to the archive server. The archive server may be a cloud server or other types of servers. In addition, the identity information belonging to the suspicious identity may further be set in the database in advance, for example, the identity information belonging to one wanted person. In a case that the edge computing device identifies the identity information of one object in the environment belonging to the suspicious identity, warning is performed in real time according to the identity information. For example, the identity information is transmitted to a device of a security guard of the environment in real time. In the foregoing manner, the diversity and the effectiveness of the warning are improved.

In operation 103, the central control device monitors an operating status of each of the plurality of edge computing devices.

Herein, the elected central control device monitors the operating status of each of the plurality of edge computing devices (including the central control device itself) in the environment. For example, the central control device may perform heartbeat monitoring on the other edge computing devices. Specifically, the central control device transmits heartbeat information to the other edge computing devices at intervals. The other edge computing devices may also transmit the heartbeat information to the central control device at intervals. In a case that the central control device does not receive the heartbeat information of one edge computing device within a set timeout duration, it is determined that the edge computing device is in the fault status.

In operation 104, the system performs a fault response operation on one edge computing device in a fault status in a case that the central control device monitors the edge computing device in the fault status.

For example, the central control device transmits related information of the edge computing device in the fault status as warning information to a manager of the distributed object identification system, so as to prompt the manager to repair the edge computing device in the fault status. Definitely, the fault response operation is not limited thereto. For different types of edge computing devices, the central control device may implement different fault response operations in a targeted manner, and the details are described below.

In some embodiments, after operation 101, the method further includes monitoring, by the edge computing device, an operating status of the central control device, transmitting a verification request to other edge computing devices in a case that it is detected that the central control device is in a fault status, the verification request being used for verifying a network connection relationship with the central control device, and performing election with the other edge computing devices connectable to the central control device in a case that a proportion of the edge computing devices failing to be connected to the central control device in a plurality of edge computing devices is greater than a proportion threshold, to determine a new central control device, such that the new central control device performs warning according to the central control device in the fault status.

While the central control device monitors the operating status of the other edge computing devices, the other edge computing devices may also monitor the operating status of the central control device. In a case that the edge computing device detects that the central control device is in the fault status, for example, in a case that the edge computing device does receive the heartbeat information of the central control device within a timeout duration, the verification request is transmitted to the other edge computing devices. The verification request is used for prompting the other edge computing devices to verify the network connection relationship with the central control device.

In a case that the proportion of the edge computing devices failing to be connected to the central control device in all of the edge computing devices is greater than the proportion threshold, the edge computing device performs election with the other edge computing devices connectable to the central control device, to elect the new central control device. The proportion threshold may be set according to an actual application scenario. For example, the proportion threshold is set to ½. After the new central control device is elected, the new central control device performs warning by using the fault information of the old central control device in the fault status as warning information, so as to remind related personnel to repair the central control device in the fault status. In the foregoing manner, the unavailability of the entire system caused by the failure of the central control device may be effectively avoided, thereby further enhancing the stability of object identification.

In some embodiments, after operation 101, the method further includes acquiring, by the central control device, device information of the plurality of edge computing devices, pairing each edge computing device with the other edge computing devices according to a set forwarding condition and the device information, and transmitting, by the edge computing device, information to the paired edge computing devices in a case that information fails to be transmitted to a monitor of the environment, such that the paired edge computing devices transmit the information to the monitor.

After the central control device is elected, the central control device may pair each edge computing device with the other edge computing devices according to the set forwarding condition and the device information of the plurality of edge computing devices. The forwarding condition may be set according to an actual application scenario. For example, in FIG. 4A, the edge computing device 400-3 pairs the edge computing device 400-1 with the edge computing device 400-2. Definitely, the edge computing device 400-3 may further be paired with other edge computing devices. The edge computing device may fail to transmit information to the monitor due to a network fault. In this case, the edge computing device transmits the information to the paired edge computing devices, such that the paired edge computing devices transmit the information to the monitor. In addition to this, in a case that one edge computing device fails to transmit the information to the monitor, the central control device may also pair the edge computing device with the other edge computing devices having desirable network conditions in real time. In the foregoing manner, the information generated by the edge computing device may be successfully transmitted, thereby increasing a success rate of information transmission.

In the embodiments of this disclosure, it may be learned from the above exemplary embodiment in FIG. 4A that, the work of video capture and object identification is integrated inside the edge computing device. In this way, even if one edge computing device fails, the normal operation of the other edge computing devices will not be affected. The central control device may also better repair the fault problem by performing the fault response operation, thereby enhancing the stability of object identification.

Figure 4B:
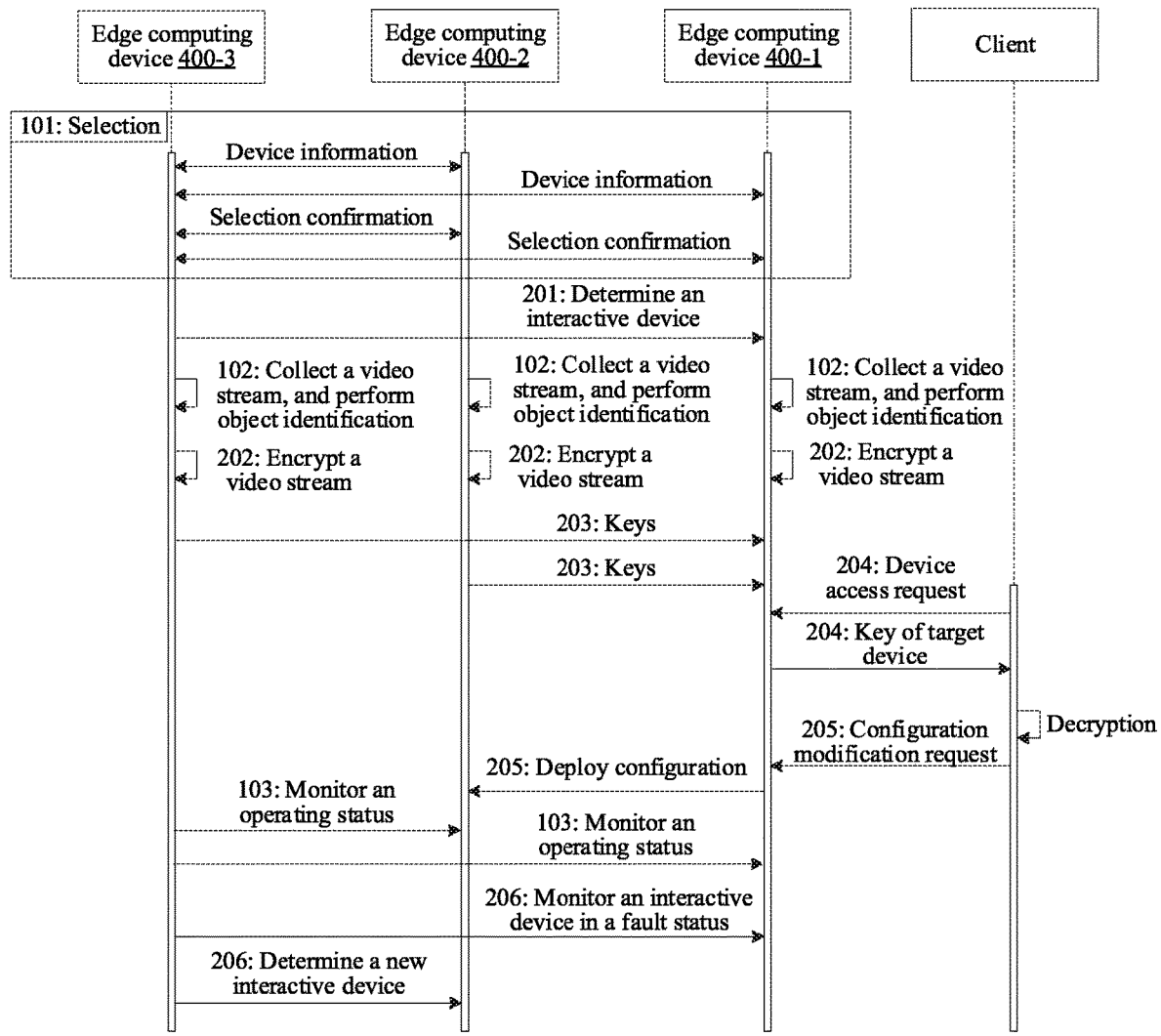
FIG. 4B is a flowchart of the distributed object identification method according to an embodiment.

FIG. 4B is a flowchart of the distributed object identification method according to an embodiment. Based on FIG. 4A, after operation 101, operation 201 may further include acquiring, by the central control device, device information of the plurality of edge computing devices, and determining an interactive device from the plurality of edge computing devices according to a set interaction condition and the device information.

Herein, the central control device may acquire the device information of the plurality of edge computing devices, and determine the interactive device from the plurality of edge computing devices according to the interaction condition and the device information. The interactive device is configured to interact with a client. Similarly, the interaction condition may be set according to the actual application scenario. For example, the edge computing device that may be connected to the external network and has a relatively good network condition and a high processing capability is determined as the interactive device. In order to prevent an excessive processing pressure of the central control device, the interactive device may be determined from the plurality of edge computing devices other than the central control device. There may be one or more determined interactive devices. The interactive device is used as the edge computing device 400-1 by way of example in FIG. 4B.

In operation 202, the edge computing device encrypts the captured video stream according to a key possessed by the edge computing device.

Each of the edge computing devices distributed in the environment generates a key according to an encryption algorithm, and encrypts the video stream according to the key possessed by the edge computing device after capturing the video stream. In the embodiments of this disclosure, a type of the encryption algorithm is not limited. For example, the encryption algorithm may be an advanced encryption standard (AES) algorithm.

In operation 203, the interactive device acquires the key possessed by the plurality of edge computing devices.

For example, in FIG. 4B, the edge computing devices 400-2 and 400-3 transmit the keys thereof to the edge computing device 400-1.

In operation 204, in response to a device access request of a client, the interactive device determines, from the plurality of edge computing devices, a target device requested by the device access request, transmits a key possessed by the target device to the client, such that the client decrypts the encrypted video stream in the target device according to the key possessed by the target device.

In a case that the interactive device receives the device access request of the client, the target device requested by the device access request is determined according to content of the device access request, and the key possessed by the target device is transmitted to the client. The interactive device may acquire and store the keys possessed by the plurality of edge computing devices in advance, and may also acquire the key possessed by the target device in real time when receiving the device access request. In addition, the client herein corresponds to the initiator above. The initiator may be a person or a device in the monitor. The client may decrypt the encrypted video stream in the target device after obtaining the key possessed by the target device, such that a user of the client may conveniently watch the decrypted video stream.

In some embodiments, operation 204 further includes acquiring, by the interactive device, an address of the target device, transmitting the address of the target device to the client, such that the client accesses the target device according to the address of the target device, and decrypting the encrypted video stream in the target device according to the key possessed by the target device. In some embodiments, operation 204 further includes acquiring the encrypted video stream in the target device, and transmitting the encrypted video stream to the client, such that the client decrypts the encrypted video stream according to the key possessed by the target device.

The embodiments of this disclosure provide two implementations for the client to access the video stream. The first implementation is to push streams, that is, the interactive device directly transmits the address of the target device to the client. The client accesses the target device according to the address of the target device, and decrypts the encrypted video stream in the target device according to the key possessed by the target device. The second implementation is forwarding, that is, the interactive device acquires the encrypted video stream in the target device, and forwards the encrypted video stream to the client. The client decrypts the encrypted video stream according to the received key possessed by the target device. In the foregoing manner, the flexibility of video stream services is improved.

In operation 205, the interactive device determines, from the plurality of edge computing devices in response to a configuration modification request, a device requested by the configuration modification request, and deploys configuration in the configuration modification request to the determined device.

In addition to the response to the device access request, the interactive device may further determine, in response to the configuration modification request initiated by the client, the device requested by the configuration modification request from the plurality of edge computing devices (including the interactive device itself). Then the configuration in the configuration modification request is deployed to the determined device. In FIG. 4B, the device is used as the edge computing device 400-2 by way of example for description.

In FIG. 4B, operation 104 shown in FIG. 4A may be updated to operation 206. In operation 206, the central control device performs warning according to an interactive device in a fault status when monitoring the interactive device in the fault status, and determines a new interactive device from the plurality of edge computing devices in a non-fault status according to the interaction condition and the device information, to replace the interactive device in the fault status.

The elected central control device monitors the plurality of edge computing devices. In a case that the central control device monitors the interactive device in the fault status, the fault information of the interactive device in the fault status is used as warning information to perform warning. In addition, the central control device further determines a new interactive device from the plurality of edge computing devices in the non-fault status according to the interaction condition and the device information, to replace the interactive device in the fault status, such that an interaction service in the distributed object identification system may be continuously and normally operated. In FIG. 4B, the new interactive device is used as the edge computing device 400-2 by way of example.

In the embodiments of this disclosure, it may be learned from the above exemplary embodiment in FIG. 4B that, the interactive device is determined to respond to the device access request and the configuration modification request of the client, thereby enhancing an effect of interaction with the client. In addition, in a case that the interactive device fails, the central control device elects the new interactive device, further enhancing the stability of object identification.

Figure 4C:
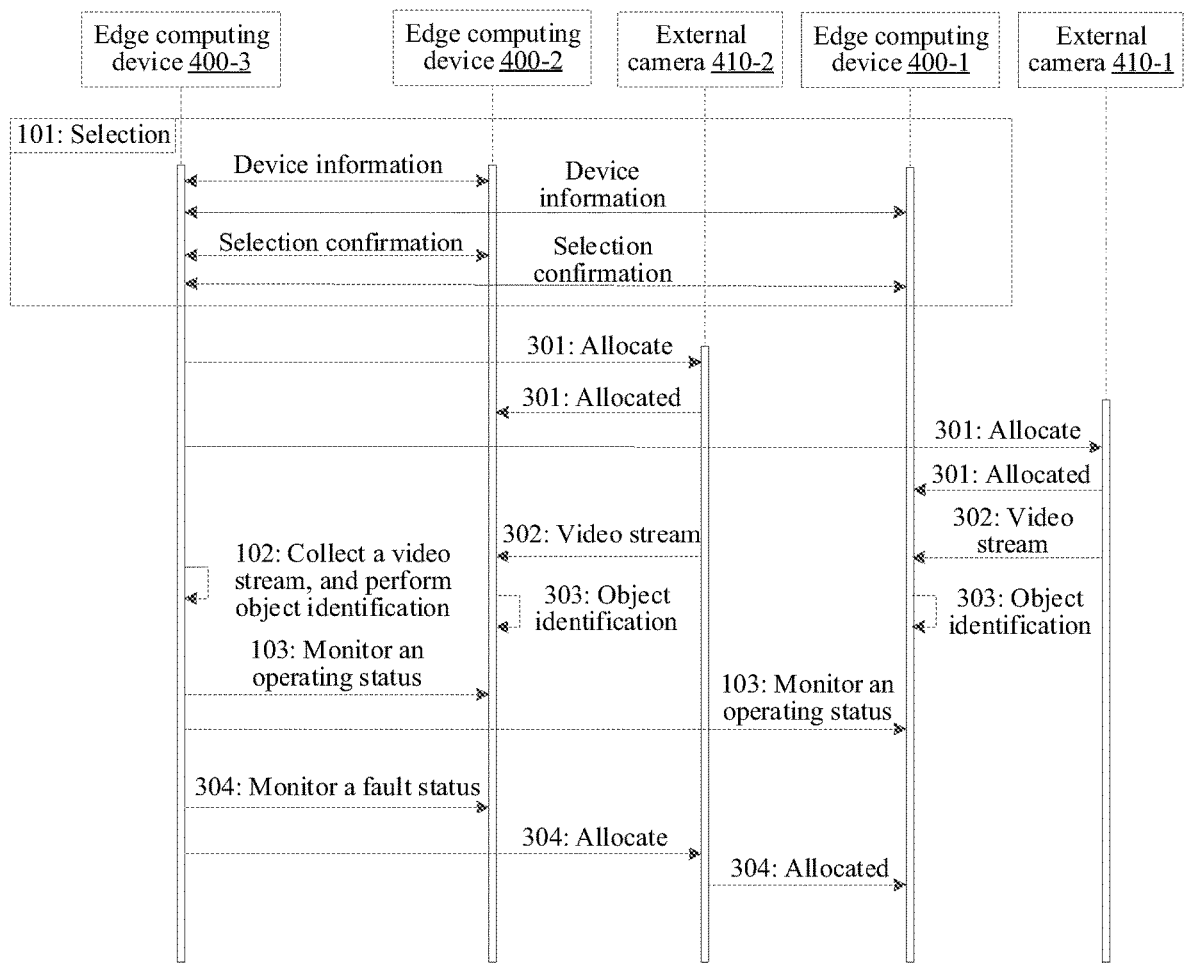
FIG. 4C is a flowchart of the distributed object identification method according to an embodiment.

FIG. 4C is a flowchart of the distributed object identification method according to an embodiment. Based on FIG. 4A, after operation 101, operation 301 may further include acquiring, by the central control device, device information of first edge computing devices, and allocating the external cameras to one of the connectable first edge computing devices according to a set allocation condition, the device information, and the first edge computing devices to which external cameras are connectable.

In the embodiments of this disclosure, the edge computing device includes two types. The first edge computing device is configured to be connected to the external camera. A camera is integrated in a second edge computing device. In FIG. 4C, for example, the first edge computing device includes the edge computing devices 400-1 and 400-2, the second edge computing device includes the first edge computing device 400-3, and the external camera includes 410-1 and 410-2. After the central control device is elected, the central control device allocates, according to the device information of the edge computing devices 400-1 and 400-2, the set allocation condition, and the first edge computing device to which each external camera is connectable, each external camera to one of the first edge computing devices to which the external camera is connectable. The allocation condition may be set according to an actual application scenario. Herein, the allocation may be performed according to a principle of equalization, that is, quantities of the external cameras allocated to the first edge computing device are guaranteed to be the same. More external cameras may also be allocated to the first edge computing devices having better network conditions and higher processing capabilities. The quantity of the cameras allocated to each first edge computing device does not exceed a quantity threshold, so as to ensure that the processing pressure of each first edge computing device will not be excessive. The quantity threshold may be set according to the actual application scenario. In FIG. 4C, for example, the external cameras 410-1 and 410-2 may be connected to the edge computing devices 400-1 and 400-2, and the central control device allocates the external camera 410-1 to the edge computing device 400-1 and allocates the external camera 410-2 to the edge computing device 400-2. Upon completion of the allocation, an allocation relationship between the external cameras and the first edge computing devices may be stored in the form of configuration, which facilitates subsequent query.

In FIG. 4C, operation 102 shown in FIG. 4A may be implemented by using operation 302 to operation 303, which is to be described with reference to each operation.

In operation 302, the external cameras capture the video stream of the environment, and transmit the video stream to the first edge computing devices to which the external cameras are allocated.

For example, the external camera 410-1 captures the video stream of the environment, and transmits the video stream to the edge computing device 400-1 to which the external camera is allocated. The external camera 410-2 captures the video stream of the environment, and transmits the video stream to the edge computing device 400-2 to which the external camera is allocated.

In operation 303, the first edge computing device performs object identification on the video stream to obtain identity information of an object in the video stream.

For example, the first edge computing device performs the object identification on the video stream transmitted by the external cameras to obtain the identity information of the object in the video stream.

In FIG. 4C, operation 104 shown in FIG. 4A may be updated to operation 304. In operation 304, the central control device performs warning according to the first edge computing device in the fault status when monitoring the first edge computing device in the fault status, determines the external camera allocated to the first edge computing device in the fault status, and allocates the camera to the connectable first edge computing device in the non-fault status according to the allocation condition, the device information, and one first edge computing device in the non-fault status to which the camera is connectable.

Herein, the central control device performs warning according to the first edge computing device in the fault status when monitoring the first edge computing device in the fault status. In addition, for ease of distinguishing, the external camera allocated to the first edge computing device in the fault status is named the mounted camera. Since the first edge computing device in the fault status is no longer available and fails to perform the objection identification, the central control device allocates the mounted camera to the connectable first edge computing device in the non-fault status according to the allocation condition, the device information, and one of the first edge computing devices in the non-fault status to which the mounted camera is connectable, so as to ensure that the video stream captured by the mounted camera may be timely processed, thereby enhancing the stability of object identification. In FIG. 4C, the central control device detects that the operating status of the edge computing device 400-2 is the fault status, and therefore the external camera 410-2 originally allocated to the edge computing device 400-2 is reallocated to the edge computing device 400-1, such that the edge computing device 400-1 performs object identification on the video stream captured by the external camera 410-2.

In some embodiments, after operation 103, the method further includes performing warning according to the second edge computing device in the fault status in a case that the central control device monitors the second edge computing device in the fault status.

Since the cameras are integrated in the second edge computing device, the central control device performs warning according to the second edge computing device in the fault status when monitoring the second edge computing device in the fault status. For example, the fault information of the second edge computing device in the fault status is used as the warning information, and is transmitted to a manager of the distributed object identification system, so as to prompt the manager to perform repairing as soon as possible.

In the embodiments of this disclosure, it may be learned from the above exemplary embodiment in FIG. 4C that, the central control device allocates the external camera to the first edge computing device, thereby implementing the automatic management and maintenance of the allocation relationship.

The following describes an exemplary application of this embodiment of this disclosure in an actual application scenario. The distributed object identification system provided in the embodiments of this disclosure is applicable to various application scenarios of object identification, for example, vehicle monitoring, campus security, community security, and the like. The face identification in the scenario of campus security is used as an example below, that is, the environment is the entire campus. Definitely, actual object identification is not limited to face identification, for example, may further be human body identification, gait identification, and the like.

Since there are a plurality of sub-environments that need to be monitored in a campus, such as teaching buildings, playgrounds, corridors, and gardens, the campus security has characteristics such as a large range, a large quantity of sites, and complex wiring. In the embodiments of this disclosure, the edge computing device that needs to be connected to the external camera is referred to as the first edge computing device. The edge computing device having the cameras integrated inside is referred to as the second edge computing device, also referred to as an artificial intelligence (AI) camera. Therefore, in the scenario of campus security, the first edge computing device may be used to connect an original external camera in the campus, and object identification (face identification) is performed on the first edge computing device. In a case that a new camera is mounted, the AI camera having a face identification capability may also be mounted. The external camera may refer to a camera not having a face identification capability. A plurality of external cameras are connected to the plurality of first edge computing devices by using network cables. The first edge computing devices may be interconnected with the AI cameras by using wireless networks (definitely, the first edge computing devices may also be interconnected with the AI cameras by using wired networks, the wireless connection is used as an example for description herein).

In a case that the distributed object identification system is started, the central control device is elected from all of the edge computing devices according to a first user rule for monitoring the operation of the other edge computing devices. The first user rule herein corresponds to the election condition above. In addition, the central control device elects one edge computing device according to a second user rule as a bearing device of a webpage system. The second user rule corresponds to the interaction condition above. The bearing device corresponds to the interactive device above. The central control device further allocates each external camera to one of the connectable first edge computing devices according to a third user rule. The involved user rules above may be restriction rules established according to parameters such as device types, network conditions, processing capabilities, and device loads of the edge computing devices. The network conditions may include measurement factors such as a bandwidth, a delay, and reliability. The bandwidth may refer to the ability of data transmission per unit time. The delay may refer to the time required to transmit a data packet from an information source to a destination. The reliability may refer to an error rate of transmitted data packets. For the device types, different edge computing devices have different operational capabilities.

For example, some models of the AI cameras have weak computing capabilities and only support the identification, stream pushing, and reporting of video streams of the cameras, while some AI cameras or some first edge computing devices have stronger computing power and may provide webpage services. Therefore, the user rules may be established according to the device types. In the actual application scenario, devices with stronger processing capabilities and better network conditions are preferentially elected as the central control device and the bearing device of the webpage system.

A user may connect to the webpage system by using a webpage to check the status of the distributed object identification system and modify system configuration. The user may directly connect to the AI camera by using the webpage system or connect to the external camera by using the first edge computing device when checking the video stream of one camera, to check the encrypted video stream. Results obtained by face identification of each edge computing device in the campus may be transmitted to a user-designated device via the network.

The elected central control device is configured to perform heartbeat monitoring on the other edge computing devices. In a case that any device in the distributed object identification system fails, the central control device transmits the corresponding warning information to the user-designated device, such as a mailbox of a system manager. In a case that the bearing device (equivalent to a webpage server) of the webpage system fails, the central control device elects one edge computing device from the other edge computing devices according to the second user rule as a new bearing device, so as to allow the edge computing device to continuously operate the webpage system. In a case that the first edge computing device configured to be connected to the external camera fails, the central control device reallocates, to the other first edge computing devices, the external camera allocated to the first edge computing device. In a case that the AI camera or the first edge computing device fails to transmit information to the user due to a network fault, the central control device is responsible for pairing the device with other edge computing devices having desirable network conditions, such that the edge computing devices having desirable network conditions may forward the information.

Figure 5:
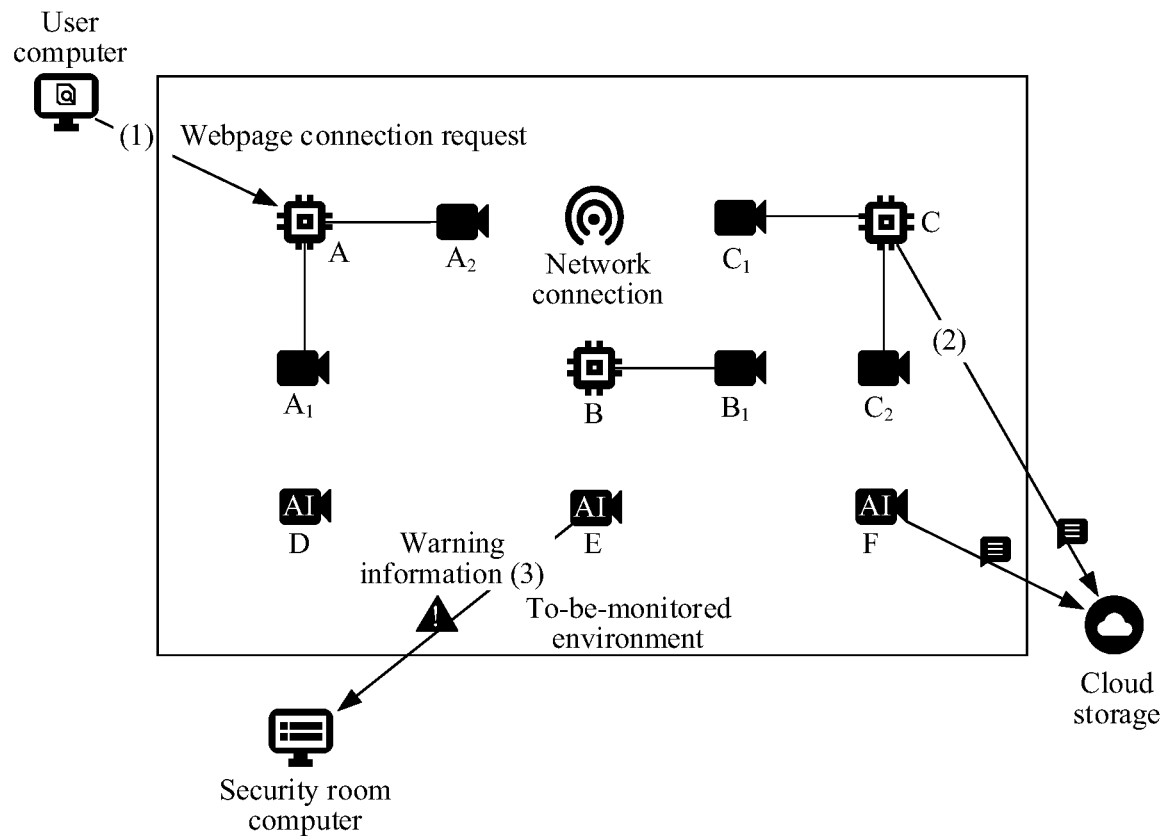
FIG. 5 is a diagram of an architecture of a face identification and processing system according to an embodiment.

FIG. 5 is a diagram of an architecture of a face identification and processing system according to an embodiment. In order to perform face identification throughout the campus, the built system may include two parts:

1) A first part: a face identification and processing system, for ease of description, referred to as S1. The S1 corresponds to the above distributed object identification system, and is composed of a plurality of following two parts:

① AI camera: The AI camera is a camera having the video capture capability and the face identification capability, that is, the second edge computing device, may be connected to a network environment.

② Face identification subsystem: The face identification subsystem is referred to as S2 for ease of description, each unit of S2 including one first edge computing device and a plurality of external cameras. For ease of understanding, in the embodiments of this disclosure, a schematic diagram of the face identification and processing system shown in FIG. 5 is provided. In FIG. 5, devices A, B, and C are all the first edge computing devices, and devices D, E, and F are all the AI cameras. The device A is connected to the external cameras A1 and A2 to form a unit of S2, and so on. The first edge computing device may be configured to connect the external camera to the AI camera and capture the video stream by using the external camera, has a certain face identification capability, and may be connected to the network environment.

2) The second part: a user device, including the following two types.

① System monitoring device: The system monitoring device is referred to as D1 for ease of description, may refer to any device that is connectable to the S1 via a network, and includes, but is not limited to, a personal computer (PC), a smart phone, a notebook computer, and a tablet computer. Such devices may be connected via webpages, manage and issue a configuration of the S1, and check the operating status of the S1. Such devices only need to be turned on when in use, and the operation of the S1 does not depend on the device.

② System information receiving device: The system information receiving device is referred to as D2 for ease of description, may refer to any device that is connectable to the S1 via a network, and includes, but is not limited to, a PC, a smart phone, a notebook computer, and a server. Such devices receive information such as warning and logs from the S1. Similarly, the D2 is not a necessary part of the S1.

During actual application, functions of the D1 and the D2 may be integrated in a same device. Definitely, the D1 and the D2 may be different devices. In addition, the user devices D1 and D2 are located outside the environment (campus), but this is only to indicate an identity difference between the user device and the device in the S1. In fact, the D1 and the D2 may be located in the environment or outside the environment.

The S1 is described in detail below. The S1 includes a plurality of AI cameras and a plurality of units of S2. The AI cameras and the S2 all include the following modules.

1) Face identification and result transmission module: referred to as M1 for ease of description and including the following submodules:

① Video module: The video module is an implementation of a basic function of a camera, and is configured to extract a video stream or an image from the camera. The camera herein also directly provides a stream pushing service. The D1 accesses an address of an edge computing device through a webpage, and may directly play the video stream captured by the camera. The video stream may be encrypted by the edge computing device.

② Face identification module: The face identification module is configured to extract the image from the video module to perform face identification, match an obtained face feature with face feature samples in a face database, and determine identity information corresponding to the matched face feature sample.

③ Data reporting module: The data reporting module generates a data result after acquiring the identity information, and reports the data result to a designated address. In a case that a network connection to the designated address fails to be established, a data result is reported to a bearing device of a webpage system and forwarded to the designated address by the bearing device. The identity information may be presented to a user for checking, and other operations such as personnel monitoring and human flow statistics may also be performed.

④ Face database: The face database is a database that saves the face feature samples and the corresponding identity information. The face feature samples may be obtained by performing feature extraction on an image or a video including face samples. Definitely, the image or the video including the face samples may alternatively be directly stored in the face database.

2) Webpage front end and camera connection module: The webpage front end and camera connection module is referred to as M2 for ease of description, and includes the following submodules:

① Webpage system: The webpage system is a system interacting with the user, such that the user may access the S1 at the D1 and check the status of the S1. In addition, the webpage system may be configured to concretize requests and configurations of the users into system instructions to be executed by the S1. As indicated by (1) in FIG. 5, a user PC establishes a connection to the webpage system by using a webpage connection request such as a hypertext transfer protocol (HTTP) request, to access the webpage system. In this case, the bearing device of the webpage system is equivalent to an HTTP server. The user PC may establish the connection to the webpage system in a manner of client software and a command line (a terminal and SHELL). A connection manner is not limited to the HTTP. The connection may also be implemented by using other protocols, for example, by using a secure shell (SSH) protocol, a remote system call, and the like.

② Configuration management system: The configuration management system deploys a configuration modification initiated by the user from the front end of the webpage to each device of the S1, and is responsible for management, synchronization, and backup configuration.

③ Information warning system: The information warning system has a plurality of types of information to be notified to users, for example, identified identity information, system fault information, and the like, and is responsible for transmitting the information to a designated device. As indicated by (2) and (3) in FIG. 5, the identity information obtained by a device C and a device F is transmitted to cloud storage for storage. In a case that a device E obtains the identity information belonging to a suspicious identity, the identity information is used as warning information to be transmitted to a computer in a security room to remind the campus security guard to pay attention.

④ Monitoring and maintenance system: The monitoring and maintenance system is responsible for the robust operation and faulty warning of the entire system, and specifically includes automatic election and maintenance of the bearing device of the webpage system, automatic management and maintenance of the first edge computing device in the S2, and automatic election and maintenance of the bearing device of the information warning system.

The webpage system is to be further described. Each device (the AI camera or the first edge computing device in the S2) in the S1 having a certain processing capability may operate the webpage system. The user may preset, in the second user rule, devices or some types of devices that may operate the webpage system. The webpage system may operate one or more devices in the S1. The user may access the S1 via the webpage system and modify the configuration in the S1 when needing to manage the system configuration. In addition, the webpage system further provides checking services of the video stream of the camera. A device D1 may access the webpage system when needing to check the video stream of one camera. The webpage system is to load information of the corresponding camera and plays the video stream. The AI camera or the first edge computing device in the S2 may be set to push the stream, that is, live streaming. Alternatively, the corresponding video stream may be forwarded by the webpage system. For example, stream pushing is performed in a case that the network condition is desirable.

The information warning system in the M2 is to be further described. The information warning system is responsible for transmitting the information in the S1 to the corresponding device D2. Each device in the S1 that is connectable to the D2 (that is, an external network) may independently operate the system. In the information warning system, the information may be divided into a plurality of topics. A corresponding transmission delay and the D2 device as a transmitted object may be set for each topic. For example, the topics that may be set include the following:

1) System failure information: The system failure information has a zero delay, and a receiving device is a system maintenance manager. In a case that any device fails, the information warning system transmits the corresponding information in real time to each system manager.

2) Identity information: The identity information is transmitted every 10 seconds, and the receiving device is an archive server and configured to archive the situation that the personnel enter and leave the places.

3) Identity information belonging to a suspicious identity: The identity information has a zero delay, and the receiving device is a computer in a security room. That is to say, in a case that a suspicious person appears, the information warning system transmits warning information to the security room in real time.

Figure 6:
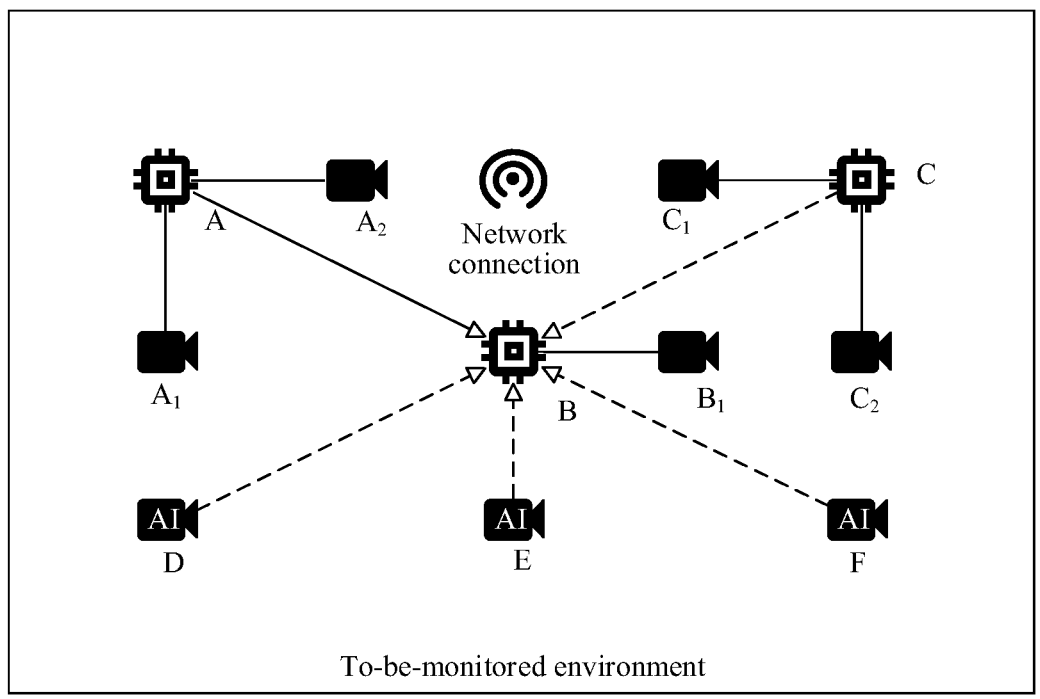
FIG. 6 is a diagram of an architecture of a face identification and processing system according to an embodiment.

FIG. 6 is a diagram of an architecture of a face identification and processing system according to an embodiment. The monitoring and maintenance system in the M2 is further described, and may be operated on each device in the S1. In the embodiments of this disclosure, one device is elected from all of the devices in the S1 as a central control device. The device is configured to operate the monitoring and maintenance system, and is specifically responsible for: monitoring the operating status of all other devices by receiving heartbeat information, electing a backup bearing device of the webpage system, and managing an allocation relationship between the first edge computing device and the external camera in the S2. As shown in FIG. 6, the device B in FIG. 6 is elected as the central control device. The other AI cameras and the first edge computing device transmit heartbeats to the device B to be monitored.

The foregoing design is mainly specific to the following situations:

1) The bearing device of the webpage system fails. In a case that a heartbeat timeout of the bearing device of the webpage system is monitored by the monitoring and maintenance system, the user is first informed by the information warning system, and then one of the backup bearing devices (for example, all devices in a non-fault status other than the bearing device of the webpage system) is elected as a new bearing device of the webpage system, so as to guarantee the continuous availability of the webpage system.

2) The first edge computing device in the S2 fails. In a case that a heartbeat timeout of the first edge computing device is monitored by the monitoring and maintenance system, the user is first informed by the information warning system, then the external camera connected to the first edge computing device is found from the configuration management system, some of the remaining first edge computing devices in the S2 are elected according to a third user rule set by the user, and the external cameras are respectively mounted to the corresponding first edge computing devices, to ensure that each external camera is available.

3) The AI camera fails. In a case that a heartbeat timeout of the AI camera is monitored by the monitoring and maintenance system, the user is first informed by the information warning system.

4) The external camera fails. In a case that the first edge computing devices in the S2 detects a failure of the mounted (allocated) external camera, the user is first informed by the information warning system.

5) The devices in the S1 fail to use the information warning system. The central control device designates, according to a forwarding rule set by the user, in the devices in the S1 that may use the information warning system, an information forwarding device of the device failing to use the information warning system. The information forwarding device forwards the information.

Figure 7:
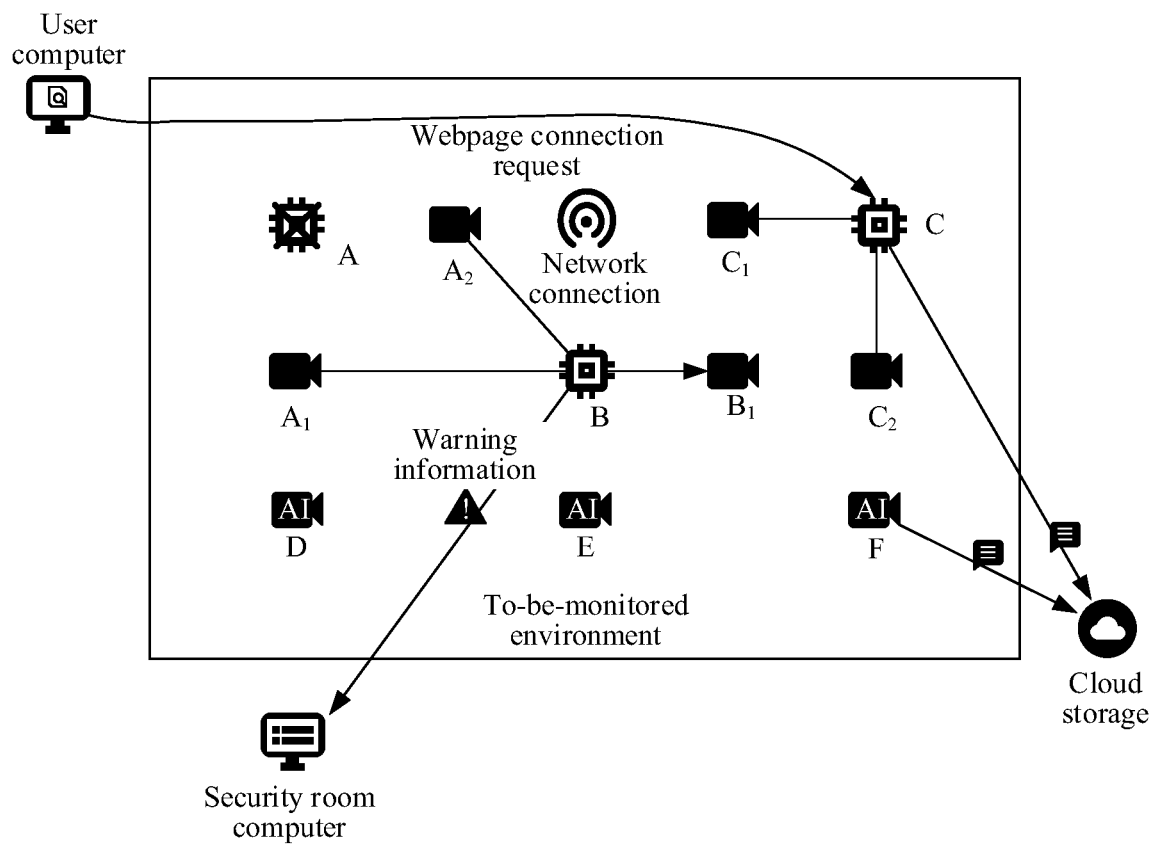
FIG. 7 is a diagram of an architecture of a face identification and processing system according to an embodiment.

FIG. 7 is a diagram of an architecture of a face identification and processing system according to an embodiment. As shown in FIG. 7, in a case that the edge computing device A originally bearing the webpage system fails, the previously elected central control device B transmits the warning information to a manager, and a device C is elected to bear the webpage system. The external cameras A1 and A2 originally mounted on the device A are mounted on the device B again.

In addition, in a case that the central control device fails, for example, after the device E transmits a heartbeat to the central control device B, a timeout of return information is acquired, and the device E requests other non-central control devices in a local area network, that is, in the S1, to verify whether the central control device is faulty. In a case that more than half of the devices in the local area network fail to be connected to the central control device, and the devices may access the external network, a new round of election is initiated among the connected devices. The new central control device is elected according to the first user rule, and informs the user of the failure of the old central control device B through the information warning system, so as to guarantee the availability of the entire system.

The following technical effects may be achieved through the embodiments of this disclosure:

1) System stability is high. A decentralized design avoids the risk of system unavailability due to the failure of devices such as a centralized face identification server (a computing server), a front-end access server, and a data reporting server in a conventional face identification system is avoided. The distributed edge computing devices ensure that the system may still normally operate in a case that some edge computing devices fail.

2) Implementation costs are low. Since a conventional face identification server (the computing server) has huge purchasing costs and maintenance costs due to high loads and a large number of computations. In the embodiments of this disclosure, the face identification is completed on the decentralized AI cameras or the first edge computing devices, thereby reducing the costs.

3) Deployment is easy and a requirement for a network condition is low. Conventional face identification requires the decentralized cameras to connect the server. In case of a wired manner, it is difficult to deploy due to complex wiring. In case of a wireless manner, requirements for the network conditions are relatively high due to the need to transmit a large quantity of images or video streams. In the embodiments of this disclosure, the face identification is completed on the decentralized AI cameras or the first edge computing devices, which may be deployed via a wireless network without transmitting the images or the video streams of each camera, and has low requirements for the network conditions.

4) Safety is high. A conventional external camera fails to encrypt a real-time video stream. In the embodiments of this disclosure, the video stream is encrypted by the AI cameras or the first edge computing devices. In this way, the safety is high, and pictures including the real-time behaviors of the user may be effectively prevented from being leaked.

An exemplary structure of software modules in the edge computing device 400 provided in the embodiments of this disclosure is continuously described below. In some embodiments, as shown in FIG. 3, the software modules stored in a memory 440 may include: an edge computing module 4431, configured to perform election with other edge computing devices in an environment, to determine a central control device from the plurality of edge computing devices in the environment, and further configured to capture a video stream of the environment, and perform object identification on the video stream to obtain identity information of an object in the video stream; and a central control module 4432, configured to monitor an operating status of each of the plurality of edge computing devices in a case that one edge computing device is the central control device, and perform a fault response operation on the edge computing device in a fault status in a case that the edge computing device in the fault status is monitored.

In some embodiments, the edge computing module 4431 is further configured to encrypt the captured video stream according to the key possessed by the edge computing device.

The central control module 4432 is further configured to acquire device information of the plurality of edge computing devices in a case that the edge computing device is the central control device, and determine an interactive device from the plurality of edge computing devices according to a set interaction condition and the device information.

The edge computing device 400 further includes an interactive module 4433. The interactive module 4433 is configured to acquire the keys possessed by the plurality of edge computing devices in a case that the edge computing device is the interactive device; and in response to a device access request, determine, from the plurality of edge computing devices, a target device requested by the device access request, and transmit a key possessed by the target device to an initiator of the device access request, such that the initiator decrypts the encrypted video stream in the target device according to the key possessed by the target device.

In some embodiments, the interactive module 4433 is further configured to in a case that the edge computing device is the interactive device, acquire an address of the target device, transmit the address of the target device to the initiator, such that the initiator accesses the target device according to the address of the target device, and decrypt the encrypted video stream in the target device according to the key possessed by the target device. Alternatively, the interactive module 4433 is further configured to acquire the encrypted video stream in the target device, and transmit the encrypted video stream to the initiator, such that the initiator decrypts the encrypted video stream according to the key possessed by the target device.

In some embodiments, the interactive module 4433 is further configured to determine, from the plurality of edge computing devices in response to a configuration modification request in a case that the edge computing device is the interactive device, a device requested by the configuration modification request, and deploy a configuration in the configuration modification request to the device.

In some embodiments, the central control module 4432 is further configured to perform warning according to the interactive device in a fault status in a case that the edge computing device is the central control device and monitors the interactive device in the fault status, and determine a new interactive device from the plurality of edge computing devices in a non-fault status according to the interaction condition and the device information, to replace the interactive device in the fault status.

In some embodiments, the central control module 4432 is further configured to in a case that the edge computing device is the central control device, acquire the device information of the first edge computing device, and allocate the external camera to one of the connectable first edge computing devices according to a set allocation condition, the device information, and the first edge computing device that is connectable to the external camera. Types of the edge computing devices may include the first edge computing device and the second edge computing device. The first edge computing device is configured to be connected to the external camera, and cameras are integrated in the second edge computing devices. A quantity of cameras allocated to each first edge computing device does not exceed a quantity threshold.

The edge computing module 4431 is further configured to acquire a video stream in the allocated external camera. The external camera is configured to capture the video stream of the environment.

In some embodiments, the central control module 4432 is further configured to perform warning according to the first edge computing device in the fault status in a case that the edge computing device is the central control device and monitors the first edge computing device in the fault status, determine the external camera allocated to the first edge computing device in the fault status, and allocate the camera to the connectable first edge computing device in the non-fault status according to the allocation condition, the device information, and one first edge computing device in a non-fault status to which the camera is connectable.

In some embodiments, the central control module 4432 is further configured to perform warning according to the second edge computing device in the fault status in a case that the edge computing device is the central control device and monitors the second edge computing device in the fault status.

In some embodiments, the edge computing module 4431 is further configured to monitor an operating status of the central control device, transmit a verification request to other edge computing devices in a case that it is detected that the central control device is in the fault status, the verification request being used for verifying a network connection relationship with the central control device, and perform election with the other edge computing devices connectable to the central control device in a case that the proportion of the edge computing devices failing to be connected to the central control device in the plurality of edge computing devices is greater than a proportion threshold, to determine a new central control device, such that the new central control device performs warning according to the central control device in the fault status.

In some embodiments, the central control module 4432 is further configured to acquire device information of the plurality of edge computing devices in a case that the edge computing device is the central control device, and pair each edge computing device with other edge computing devices according to a set forwarding condition and the device information.

The edge computing module 4431 is further configured to transmit information to the paired edge computing devices in a case that information fails to be transmitted to a monitor of the environment, such that the paired edge computing devices transmit the information to the monitor.

In some embodiments, the edge computing module 4431 is further configured to extract an image from the captured video stream, and perform feature extraction on the image to obtain an object feature, match the object feature with a plurality of object feature samples in a database, and determine identity information corresponding to the matched object feature samples; and transmit the identity information to the monitor of the environment.

In some embodiments, the edge computing module 4431 is further configured to monitor an operating status of the edge computing module, and perform real-time warning according to fault information causing the fault status in a case that it is detected that the operating status of the edge computing module is the fault status.

In some embodiments, the edge computing module 4431 is further configured to transmit the identity information obtained within a transmission period to an archive server every set transmission period.

In some embodiments, the edge computing module 4431 is further configured to perform real-time warning according to the identity information in a case that the identity information is a suspicious identity.

An embodiment of this disclosure provides a computer program product or a computer program. The computer program product or the computer program includes computer instructions, and the computer instructions are stored in a computer-readable storage medium. The processor of the computer device reads the computer instructions from the computer-readable storage medium. The processor executes the computer instructions, such that the computer device performs the distributed object identification method according to the embodiments of this disclosure.

The embodiment of this disclosure provides a computer-readable storage medium storing executable instructions, the executable instructions, when executed by a processor, causing the processor to perform the method provided in the embodiments of this disclosure, for example, the distributed object identification method shown in FIG. 4A, FIG. 4B, or FIG. 4C. The computer may refer to the edge computing device.

In some embodiments, the computer-readable storage medium may be a memory such as a ferroelectric RAM (FRAM), a ROM, a programmable ROM (PROM), an erasable PROM (EPROM), an electrically EPROM (EEPROM_, a flash memory, a magnetic memory, a compact disc (CD), or a CD-ROM; or may be various devices including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed for execution on one computing device, execution on a plurality of computing devices located at one location, or execution on a plurality of computing devices that are distributed at a plurality of locations and that are interconnected through a communication network.

The following technical effects may be achieved through the embodiments of this disclosure:

1) A decentralized design avoids the risk of system unavailability due to the failure of devices such as a centralized computing server, a front-end access server, and a data reporting server in a conventional solution. The distributed edge computing devices ensure that the system may still normally operate in a case that some edge computing devices fail.

2) The central control device is elected to monitor the plurality of edge computing devices, such that in a case that one edge computing device fails, the central control device may make a quick response. In addition, in a case that the central control device fails, a new central control device may also be determined, further enhancing the stability of the system.

3) In the embodiments of this disclosure, the first edge computing device may be compatible with conventional external cameras, and the distributed object identification system may also be constructed by using the second edge computing device. Therefore, the flexibility is higher, and the construction manner may be adjusted according to the actual application scenario.

4) In the embodiments of this disclosure, object identification is completed on decentralized edge computing devices. Compared with conventional servers, the edge computing devices have lower purchasing costs and maintenance costs, such that the implementation costs of the distributed object identification system may be effectively reduced.

5) The object identification is completed on the decentralized edge computing devices, which may be deployed via the wireless network without uniformly transmitting the image or the video stream of each camera, and has low requirements for the network conditions.

6) The captured video stream may be encrypted by the edge computing device. In this way, the safety is high, and pictures including the real-time behaviors of the object may be effectively prevented from being leaked.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. An edge computing device, included in a distributed object identification system comprising a plurality of edge computing devices, wherein the edge computing device is determined as a central control device based on election from the plurality of edge computing devices, the edge computing device comprising:
   at least one memory configured to store computer program code; and
   at least one processor configured to access said computer program code and operate as instructed by said computer program code, said computer program code comprising:
      first capturing code configured to cause the at least one processor to capture a video stream of an environment;
      first obtaining code configured to cause the at least one processor to obtain identity information of an object in the video stream by performing object identification on the video stream;
      first monitoring code configured to cause the at least one processor to monitor an operating status of each of the plurality of edge computing devices;
      first performing code configured to cause the at least one processor to perform a fault response operation on one edge computing device of the plurality of edge computing devices in a fault status based on the one edge computing device in the fault status being monitored;
   first encrypting code configured to cause the at least one processor to encrypt the captured video stream based on a key possessed by the edge computing device; and
   first determining code configured to cause the at least one processor to determine an interactive device, which acquires keys possessed by the plurality of edge computing devices, from the plurality of edge computing devices based on a set interaction condition and device information of the plurality of edge computing devices, and monitor an operating status of the interactive device.

2. The edge computing device of claim 1, wherein the computer program code further comprises:
   first acquiring code configured to cause the at least one processor to acquire the device information.

3. The edge computing device of claim 2, wherein the computer program code further comprises:

second performing code configured to cause the at least one processor to perform, based on the interactive device in the fault status being monitored, warning based on the interactive device being in the fault status, and second determining code configured to cause the at least one processor to determine a new interactive device from the plurality of edge computing devices in a non-fault status based on an interaction condition and the device information to replace the interactive device in the fault status.

4. The edge computing device of claim 1, wherein types of the plurality of edge computing devices comprise first edge computing devices and second edge computing devices, wherein the first edge computing devices are configured to be connected to external cameras, wherein the external cameras are integrated in the second edge computing devices, wherein the computer program code further comprises:
second acquiring code configured to cause the at least one processor to acquire device information of the first edge computing devices, and first allocating code configured to cause the at least one processor to allocate, based on a set allocation condition, the device information, and the first edge computing devices to which the external cameras are connectable, the external cameras to one of the first edge computing devices to which the external cameras are connectable.

5. The edge computing device of claim 4, wherein the computer program code further comprises:
third performing code configured to cause the at least one processor to perform, based on one of the first edge computing devices in the fault status being monitored, warning based on the one of the first edge computing devices being in the fault status;

third determining code configured to cause the at least one processor to determine an external camera allocated to the first edge computing devices in the fault status;

second allocating code configured to cause the at least one processor to allocate the determined external camera to one of the first edge computing devices in a non-fault status based on an allocation condition, the device information, and the first edge computing devices in the non-fault status to which the external camera is connectable; and fourth performing code configured to cause the at least one processor to perform warning based on one of the second edge computing devices being in the fault status based on the one of the second edge computing devices in the fault status being monitored.

6. The edge computing device of claim 1, wherein the computer program code further comprises:
second monitoring code configured to cause the at least one processor to monitor an operating status of the central control device;

first transmitting code configured to cause the at least one processor to transmit a verification request to other edge computing devices of the plurality of edge computing devices based on detection that the central control device is in the fault status, the verification request being used for verifying a network connection relationship with the central control device; and fourth determining code configured to cause the at least one processor to determine a new central control device by performing, based on a proportion of the plurality of edge computing devices failing to be connected to the central control device in the plurality of edge computing devices being greater than a proportion threshold, election with other edge computing devices connectable to the central control device, wherein the new central control device is configured to perform warning based on the central control device being in the fault status.

7. The edge computing device of claim 1, wherein the computer program code further comprises:
third acquiring code configured to cause the at least one processor to acquire device information of the plurality of edge computing devices;

first pairing code configured to cause the at least one processor to pair each edge computing device of the plurality of edge computing devices with other edge computing devices of the plurality of edge computing devices based on a set forwarding condition and the device information; and second transmitting code configured to cause the at least one processor to transmit information to the paired edge computing devices based on information failing to be transmitted to a monitor of the environment, such that the paired edge computing devices transmit the information to the monitor.

8. The edge computing device of claim 1, wherein the computer program code further comprises:
first extracting code configured to cause the at least one processor to extract an image from the captured video stream, fifth performing code configured to cause the at least one processor to perform feature extraction on the image to obtain an object feature;

first matching code configured to cause the at least one processor to match the object feature with a plurality of object feature samples in a database;

first using code configured to cause the at least one processor to use, as the identity information of the object in the video stream, information corresponding to the matched plurality of object feature samples; and third transmitting code configured to cause the at least one processor to transmit the identity information of the object in the video stream to a monitor of the environment.

9. The edge computing device of claim 8, wherein the computer program code further comprises:
third monitoring code configured to cause the at least one processor to monitor the operating status of the plurality of edge computing devices;

sixth performing code configured to cause the at least one processor to perform first real-time warning according to fault information causing the fault status based on detecting that the operating status of one of the plurality of edge computing devices is the fault status;

fourth transmitting code configured to cause the at least one processor to transmit identity information to an archive server; and seventh performing code configured to cause the at least one processor to perform second real-time warning according to the identity information based on the identity information being a suspicious identity.

10. An edge computing method, performed by an edge computing device, the edge computing device included in a distributed object identification system comprising a plurality of edge computing devices, wherein the edge computing device is determined as a central control device based on election from the plurality of edge computing devices, the method comprising:
- capturing a video stream of an environment;
- obtaining identity information of an object in the video stream by performing object identification on the video stream;
- monitoring an operating status of each of the plurality of edge computing devices;
- performing a fault response operation on one edge computing device of the plurality of edge computing devices in a fault status based on the one edge computing device in the fault status being monitored;
- encrypting the captured video stream based on a key possessed by the edge computing device;
- determining an interactive device, which acquires keys possessed by the plurality of edge computing devices, from the plurality of edge computing devices based on a set interaction condition and device information of the plurality of edge computing device; and
- monitoring an operation status of the interactive device.

11. The method of claim 10, further comprising:
acquiring the device informations, which is of the plurality of edge computing devices.

12. The method of claim 11, further comprising:
performing, based on the interactive device in the fault status being monitored, warning based on the interactive device being in the fault status, and
determining a new interactive device from the plurality of edge computing devices in a non-fault status based on an interaction condition and the device information to replace the interactive device in the fault status.

13. The method of claim 10, wherein types of the plurality of edge computing devices comprise first edge computing devices and second edge computing devices,
wherein the first edge computing devices are configured to be connected to external cameras,
wherein the external cameras are integrated in the second edge computing devices,
wherein the method further comprises:
- acquiring device information of the first edge computing devices, and
- allocating, based on a set allocation condition, the device information, and the first edge computing devices to which the external cameras are connectable, the external cameras to one of the first edge computing devices to which the external cameras are connectable.

14. The method of claim 13, further comprising:
performing, based on one of the first edge computing devices in the fault status being monitored, warning based on the one of the first edge computing devices being in the fault status;
determining, with the central control device, an external camera allocated to the first edge computing devices in the fault status;
allocating, with the central control device, the determined external camera to one of the first edge computing devices in a non-fault status based on an allocation condition, the device information, and the first edge computing devices in the non-fault status to which the external camera is connectable; and
performing, with the central control device, warning based on one of the second edge computing devices being in the fault status based on the one of the second edge computing devices in the fault status being monitored.

15. The method of claim 10, further comprising:
monitoring an operating status of the central control device;
transmitting a verification request to other edge computing devices of the plurality of edge computing devices based on detection that the central control device is in the fault status, the verification request being used for verifying a network connection relationship with the central control device; and
determining a new central control device by performing, based on a proportion of the plurality of edge computing devices failing to be connected to the central control device in the plurality of edge computing devices being greater than a proportion threshold, election with other edge computing devices connectable to the central control device,
wherein the new central control device is configured to perform warning based on the central control device being in the fault status.

16. The method of claim 10, further comprising:
acquiring device information of the plurality of edge computing devices;
pairing each edge computing device of the plurality of edge computing devices with other edge computing devices of the plurality of edge computing devices based on a set forwarding condition and the device information; and
transmitting information to the paired edge computing devices based on information failing to be transmitted to a monitor of the environment, such that the paired edge computing devices transmit the information to the monitor.

17. The method of claim 10, further comprising:
extracting an image from the captured video stream;
performing feature extraction on the image to obtain an object feature;
matching object feature with a plurality of object feature samples in a database;
using, as the identity information of the object in the video stream, information corresponding to the matched plurality of object feature samples; and
transmitting the identity information of the object in the video stream to a monitor of the environment.

18. The method of claim 17, further comprising:
monitoring the operating status of the plurality of edge computing devices;
performing first real-time warning according to fault information causing the fault status based on detecting that the operating status of one of the plurality of edge computing devices is the fault status;
transmitting the identity information to an archive server; and
performing second real-time warning according to the identity information based on the identity information being a suspicious identity.

19. A non-transitory computer-readable storage medium storing computer instructions that, when executed by at least one processor of a device, the device comprising an edge computing device included in a distributed object identification system comprising a plurality of edge computing devices, wherein the edge computing device is determined as a central control device based on election from the plurality of edge computing devices, cause the at least one processor to:
capture a video stream of an environment;

obtain identity information of an object in the video stream by performing object identification on the video stream;

monitor an operating status of each of the plurality of edge computing devices;

perform a fault response operation on one edge computing device of the plurality of edge computing devices in a fault status based on the one edge computing device in the fault status being monitored;

encrypt the captured video stream based on a key possessed by the edge computing device;

determine an interactive device, which acquires keys possessed by the plurality of edge computing devices, from the plurality of edge computing devices based on a set interaction condition and device information of the plurality of edge computing device; and monitor an operation status of the interactive device.

20. The storage medium of claim 19, wherein the instructions, when executed, further cause the at least one processor to:

acquire the device information.

\* \* \* \* \*